United States Patent
Lee et al.

(10) Patent No.: US 9,350,056 B2
(45) Date of Patent: May 24, 2016

(54) HEAT MANAGING UNIT OF HIGH-VOLTAGE BATTERY AND HIGH-VOLTAGE BATTERY INCLUDING THE SAME

(71) Applicant: Hyundai Motor Company, Seoul (KR)

(72) Inventors: Gun Goo Lee, Suwon (KR); Yong Hwan Choi, Yongin (KR); Chan Woo Park, Columbia, MO (US)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/563,757

(22) Filed: Dec. 8, 2014

(65) Prior Publication Data
US 2016/0056513 A1    Feb. 25, 2016

(30) Foreign Application Priority Data

Aug. 22, 2014 (KR) .................. 10-2014-0109774

(51) Int. Cl.
| | |
|---|---|
| *H01M 10/6552* | (2014.01) |
| *H01M 10/613* | (2014.01) |
| *H01M 10/615* | (2014.01) |
| *H01M 10/625* | (2014.01) |

(52) U.S. Cl.
CPC ........ *H01M 10/6552* (2015.04); *H01M 10/613* (2015.04); *H01M 10/615* (2015.04); *H01M 10/625* (2015.04); *H01M 2220/20* (2013.01)

(58) Field of Classification Search
USPC ........................................... 429/120
See application file for complete search history.

(56) References Cited

U.S. PATENT DOCUMENTS

| | | | | | |
|---|---|---|---|---|---|
| 5,756,227 | A | * | 5/1998 | Suzuki | ........ F28F 3/02 429/120 |
| 5,824,432 | A | * | 10/1998 | Currle | ...... B60L 11/1874 429/112 |
| 6,653,002 | B1 | * | 11/2003 | Parise | ........ B01F 5/0614 136/200 |
| 2003/0017383 | A1 | * | 1/2003 | Ura | ..... F28D 15/0275 429/120 |
| 2006/0060236 | A1 | * | 3/2006 | Kim | ....... H01M 10/486 136/203 |
| 2006/0216582 | A1 | * | 9/2006 | Lee | ........ H01M 2/1077 429/120 |
| 2008/0311466 | A1 | * | 12/2008 | Yang | ....... H01M 10/486 429/62 |

(Continued)

FOREIGN PATENT DOCUMENTS

| | | |
|---|---|---|
| KR | 10-2006-0027578 A | 3/2006 |
| KR | 10-2011-0055008 A | 5/2011 |

(Continued)

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

Disclosed herein are a heat managing unit of a high-voltage battery and a high-voltage battery including the heat managing unit. The heat managing unit of a high-voltage battery includes: insertion heat pipes interposed between overlapped battery cells and having contact parts formed by bending upper end portions in a horizontal direction in a state in which the upper end portions are exposed; a conduction plate surface-contacting the contact parts of the insertion heat pipes to be thermally connected to the insertion heat pipes; a thermoelectric element having an air conditioning surface and a heat radiating surface, thermally connected to the conduction plate by the air conditioning surface surface-contacting the conduction plate, and cooling or heating the conduction plate through the air conditioning surface; and a heat sink surface-contacting the heat radiating surface of the thermoelectric element to be thermally connected to the heat radiating surface.

10 Claims, 4 Drawing Sheets

(56) References Cited

U.S. PATENT DOCUMENTS

| | | | |
|---|---|---|---|
| 2009/0208829 A1* | 8/2009 | Howard | F28D 15/0233 |
| | | | 429/120 |
| 2010/0266885 A1* | 10/2010 | Lee | H01M 10/6552 |
| | | | 429/120 |
| 2011/0287285 A1* | 11/2011 | Yoon | H01M 10/5016 |
| | | | 429/9 |
| 2012/0009455 A1* | 1/2012 | Yoon | H01M 10/6552 |
| | | | 429/120 |
| 2012/0231315 A1* | 9/2012 | Yoon | H01M 10/657 |
| | | | 429/120 |
| 2013/0244066 A1* | 9/2013 | Kang | H01M 2/1077 |
| | | | 429/62 |
| 2014/0013774 A1 | 1/2014 | Grunwald et al. | |

FOREIGN PATENT DOCUMENTS

| | | |
|---|---|---|
| KR | 10-2013-0060758 A | 6/2013 |
| KR | 10-2013-0136157 A | 12/2013 |
| KR | 10-2014-0020376 A | 2/2014 |

* cited by examiner

HEAT MANAGING UNIT OF HIGH-VOLTAGE BATTERY AND HIGH-VOLTAGE BATTERY INCLUDING THE SAME

CROSS REFERENCE TO RELATED APPLICATION

The present application claims priority to Korean Patent Application No. 10-2014-0109774, filed Aug. 22, 2014, the entire contents of which is incorporated herein for all purposes by this reference.

TECHNICAL FIELD

The present invention relates to a heat managing unit of a high-voltage battery and a high-voltage battery including the heat managing unit. The heat management unit of the present invention may substitute an air cooling type or a water cooling type heat managing unit of a conventional high-voltage battery and manage heat of the high-voltage battery with a simplified configuration.

BACKGROUND

A lithium battery used in a hybrid electric vehicle (HEV), a plug-in hybrid electric vehicle (PHEV), an electric vehicle (EV), or the like, has many advantages such as output, energy density, and the like, as compared with a conventional Ni-MH battery. However, due to heat generated during using the lithium battery, a lifespan of the lithium battery may decrease under an elevated temperature weather condition or an output of the lithium battery may decrease under a substantially lowered temperature weather condition. Therefore, in order to prevent the lifespan, the output, and the like, of the battery from decreasing, managing a temperature of the battery may be critical.

For the purpose of heat management, an air cooling type system cooling the battery using air or a water cooling type system cooling the battery using water, oil or the like has been used to cool the battery under the elevated temperature weather condition, and a heater core, a planar heater, or the like, has been used in order to raise a temperature of the battery under the lowered temperature weather condition.

However, generally, a cooling system and a temperature elevating system may include separate components. For example, a cooling fan, a pump, a duct, a pipe, and the like have been provided to cool the battery, or the heater core, the planar heater and the like have been mounted to raise a temperature of the battery. Accordingly, the cooling system and the temperature elevating system may not be operated without separate logics.

During cooling the battery, an air cooling type system using air or a water cooling type system using water, oil and the like has been typically used. The air cooling type system may have advantages such as simple components such as a cooling duct, a cooling fan, and the like, and a simple operation logic, but may be disadvantageous such as a complicated cooling air channel, a limitation in decreasing a volume of a battery module due to a cooling channel, noise of the cooling fan, low cooling performance and the like. On the other hand, the water cooling type system may have improved cooling performance, but may be disadvantageous such as a complicated configuration/operation logic, an excessive weight, a high cost and the like.

As a method of elevating the temperature of the battery, a method of heating air in a battery case and then raising the temperature of the battery using the heated air, a method of installing a heater core in the water cooling type system to heat a refrigerant, thereby raising the temperature of the battery and the like have been developed. However, for the temperature elevating system, a time necessary for elevating the temperature of the battery may be substantially long, efficiency of elevating temperature may be reduced since a battery housing and other components are heated in addition to the battery module. In addition, power consumption may be substantial since greater power may be consumed in elevating a temperature of a refrigerant having a high specific heat up to an optimal temperature and energy driving a refrigerant pump is also consumed.

The matters described as the related art have been provided only for assisting in the understanding for the background of the present invention and should not be considered as corresponding to the related art known to those skilled in the art.

SUMMARY OF THE INVENTION

The present invention provides a heat managing unit of a high-voltage battery which may substitute an air cooling type or a water cooling type and manage heat of the high-voltage battery with a substantially simplified configuration. A high-voltage battery including the heat managing unit is also provided.

In an exemplary embodiment of the present invention, a heat managing unit of a high-voltage battery may include: insertion heat pipes interposed between overlapped battery cells and having contact parts formed by bending upper end portions in a horizontal direction where the upper end portions are exposed; a conduction plate surface-contacting the contact parts of the insertion heat pipes to be thermally connected to the insertion heat pipes; a thermoelectric element having an air conditioning surface and a heat radiating surface, thermally connected to the conduction plate by the air conditioning surface surface-contacting the conduction plate, and cooling or heating the conduction plate through the air conditioning surface; and a heat sink surface-contacting the heat radiating surface of the thermoelectric element to be thermally connected to the heat radiating surface.

The battery cells may be pouch type battery cells and be overlapped with each other such that surfaces thereof facing each other may touch each other in a state in which the battery cells vertically stand up.

The insertion heat pipes may be each disposed between the overlapped battery cells in a gravity direction so as to be perpendicular to a ground.

The heat managing unit of a high-voltage battery may further include conduction panels surface-contacting entire areas of the battery cells, and the insertion heat pipes may be interposed between the conduction panels facing each other.

The insertion heat pipes may be disposed in an oblique line direction inclined based on a ground between the battery cells.

The conduction plate may be a horizontal heat pipe disposed in the horizontal direction.

The heat managing unit of a high-voltage battery may further include a coupling plate disposed over the battery cells and such that the exposed contact parts of the insertion heat pipes may penetrate the coupling plate, and the coupling plate may be coupled to the conduction plate such that the coupling plate may be closely adhered to the conduction plate with the contact parts interposed therebetween.

Penetration holes having shapes corresponding to those of upper ends of the contact parts may be formed in the coupling plate, and the contact parts may be fitted into the coupling plate such that the contact part may penetrate the penetration holes upwardly and be then slid laterally, and thus the coupling plate may be caught by the contact parts, thereby preventing the coupling plate from being separated upwardly.

The heat sink may include a contact panel surface-contacting the heat radiating surface of the thermoelectric element and a heat radiation fin provided on an upper end of the contact panel, and the coupling plate, the conduction plate, and the contact panel may be coupled to each other so as to be closely adhered to each other.

In an exemplary embodiment of the present invention, a high-voltage battery may include: a plurality of battery cells overlapped with each other such that surfaces of the plurality of the battery cells facing each other may touch on each other in a state in which the battery cells are vertically stand up; insertion heat pipes each of each which may be interposed between the overlapped battery cells and having contact parts formed by bending upper end portions in a horizontal direction in a state in which the upper end portions are exposed; a conduction plate surface-contacting the contact parts of the insertion heat pipes to be thermally connected to the insertion heat pipes; a thermoelectric element having an air conditioning surface and a heat radiating surface, thermally connected to the conduction plate by the air conditioning surface surface-contacting the conduction plate, and cooling or heating the conduction plate through the air conditioning surface; and a heat sink surface-contacting the heat radiating surface of the thermoelectric element to be thermally connected to the heat radiating surface.

DETAINED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described with reference to the accompanying drawings.

Figure 1:
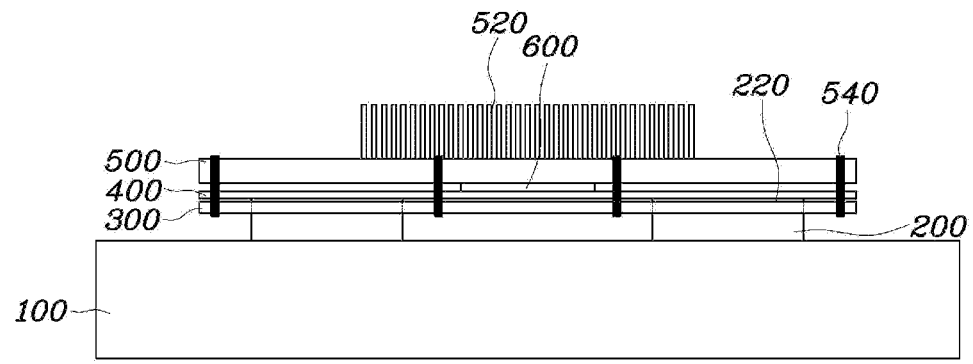
FIG. 1 is a cross-sectional view of an exemplary heat managing unit of a high-voltage battery and a high-voltage battery including the same according to an exemplary embodiment of the present invention.

FIG. 1 is a cross-sectional view of an exemplary heat managing unit of a high-voltage battery and an exemplary high-voltage battery including an exemplary heat managing unit according to an exemplary embodiment of the present invention, and FIGS. 2 to 7 are views showing an exemplary heat managing unit process of assembling an exemplary heat managing unit heat managing unit of a high-voltage battery and an exemplary heat managing unit high-voltage battery including the heat managing unit according to an exemplary embodiment of the present invention.

The present invention particularly relates to an integrated heat managing system in which cooling and temperature raising functions may be integrated with each other. The integrated heat managing system may implement the cooling and temperature raising functions by using a thermoelectric element and a heat pipe. Further, the integrated heat managing system may improve a driving distance, a cost decrease and the like by removing a cooling channel, a cooling duct, a cooling fan, and the like in an air cooling type heat managing system, thereby simplifying the system and reducing weight of the heat managing system.

In detail, FIG. 1 shows a cross-sectional view of an exemplary heat managing unit of an exemplary high-voltage battery and an exemplary high-voltage battery including the heat managing unit according to an exemplary embodiment of the present invention. The heat managing unit of a high-voltage battery may include: insertion heat pipes 200 interposed between overlapped battery cells 100 and having contact parts 220 formed by bending upper end portions in a horizontal direction in a state in which the upper end portions are exposed; a conduction plate 400 surface-contacting the contact parts 220 of the insertion heat pipes 200 to be thermally connected to the insertion heat pipes 200; a thermoelectric element 600 having an air conditioning surface and a heat radiating surface, thermally connected to the conduction plate 400 by the air conditioning surface surface-contacting the conduction plate 400, and cooling or heating the conduction plate 400 through the air conditioning surface; and a heat sink 500 surface-contacting the heat radiating surface of the thermoelectric element 600 to be thermally connected to the heat radiating surface.

The battery cells 100 that may be, but not limited to, pouch type battery cells and may be overlapped with each other such that surfaces thereof facing each other may touch on each other in a state in which they vertically stand up. The battery cells may also be disposed such that the battery cells may be overlapped with each other in the horizontal direction. The insertion heat pipes 200 may be interposed between the overlapped battery cells 100 and have the contact parts 220 formed by bending the upper end portions in the horizontal direction when the upper end portions are exposed. Accordingly, the battery cell 100 may transfer heat to the upper end portions through the insertion heat pipes 200 or receive heat from the upper end portions through the insertion heat pipes 200.

In addition, the conduction plate 400 may surface-contact the contact parts 220 of the insertion heat pipes 200 to be thermally connected to the insertion heat pipes 200. In addition, the thermoelectric element 600 may be mounted on the conduction plate 400, such that the thermoelectric element 600, the conduction plate 400, the insertion heat pipes 200, and the battery cells 100 may be thermally connected to each other.

The thermoelectric element 600 may have the air conditioning surface and the heat radiating surface and may be formed of a p-n semiconductor forming an artificial temperature difference between the air conditioning surface and the heat radiating surface at the time of applying power. Accordingly, when the power is applied, the air conditioning surface may be cold or hot and the heat radiating surface may be hot or cold to form a thermal atmosphere and may exchange a polarity of electricity to allow the air conditioning surface to be cooled or heated.

When the battery cells 100 are overheated, the battery cells 100 may be cooled through the air conditioning surface of the thermoelectric element 600, the conduction plate 400, and the insertion heat pipes 200. In addition, waste heat of the battery cells 100 may be radiated to the heat radiating surface of the thermoelectric element 600.

Meanwhile, the thermoelectric element 600 may be thermally connected to the conduction plate 400 by the air conditioning surface surface-contacting the conduction plate 400 and may cool or heat the conduction plate 400 through the air conditioning surface. The heat sink 500 may surface-contact the heat radiating surface of the thermoelectric element 600 to be thermally connected to the heat radiating surface, thereby radiating the heat to the outside. A driving wind which may occur during driving or an indoor air of a vehicle may be selectively blown to the heat sink 500, thereby effectively radiating the heat. When a heat radiation fin portion of the heat sink 500 is exposed to the outside and remaining portions including the battery cells 100 are received and closed in a housing, the battery may be in a closed type to become robust to an external factor such as dust, water, or the like and thus, heat radiation may be smoothly performed through the heat sink to prevent deterioration and improve required performance, thereby maintaining durability.

Figure 2:
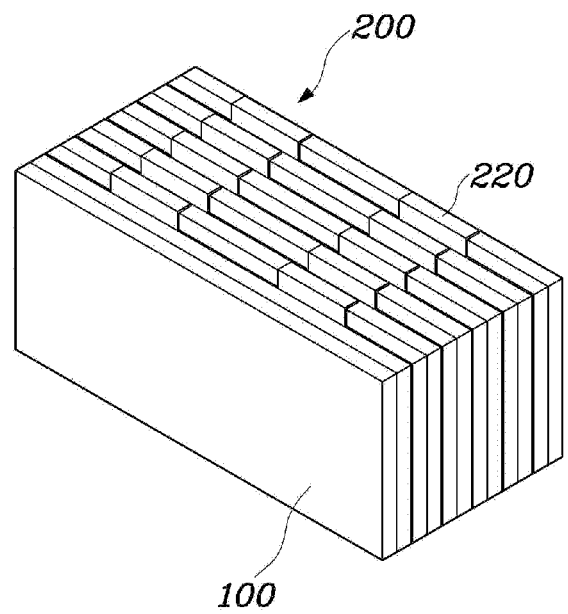
FIGS. 2 to 7 are views showing an exemplary process of assembling an exemplary heat managing unit of an exemplary high-voltage battery and an exemplary high-voltage battery including the same according to an exemplary embodiment of the present invention.
Figure 3:
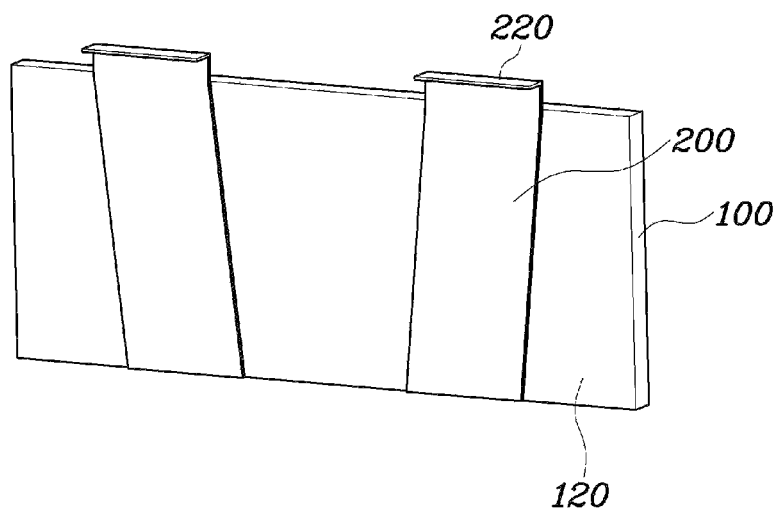

FIG. 2 shows an exemplary insertion heat pipes interposed between the battery cells, and FIG. 3 shows the insertion heat pipes of FIG. 2 in detail. As shown in FIG. 2, each of the insertion heat pipes 200 may be disposed between the overlapped battery cells 100 in a gravity direction such that the each of the insertion heat pipes may be perpendicular to a ground. The insertion heat pipes 200 may also be disposed in the horizontal direction together with the battery cells 100. Since the heat pipe uses a small amount of moisture therein, when the insertion heat pipe 200 is disposed in a direction in which condensation water drops, the heat pipe may sufficiently perform cooling. As such, the insertion heat pipe 200 may be disposed in the gravity direction and the insertion heat pipes 200 and the battery cells 100 may be disposed in the vertical direction.

Meanwhile, as shown in FIG. 3, exemplary conduction panels 120 surface-contacting entire areas of the battery cells are provided. The insertion heat pipes 200 may be interposed between the conduction panels 120 facing each other. Accordingly, the conduction panels 120 may conduct the heat through the insertion heat pipes 200, and an effect of conducting heat may uniformly appear over the entire areas of the battery cells 100. Simultaneously, the insertion heat pipes 200 may be disposed in an oblique line direction inclined based on the ground between the battery cells 100, thereby increasing contact areas between the insertion heat pipes 200 and the conduction panels 120.

Figure 6:
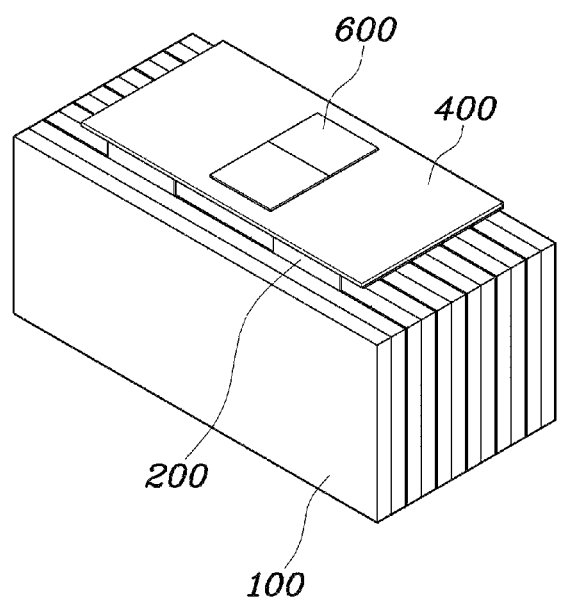

Meanwhile, the conduction plate 400 closely adhered to the contact parts 220 of the insertion heat pipes 200 may be a horizontal heat pipe disposed in the horizontal direction. As shown in FIG. 6, the conduction plate 400 which is the horizontal heat pipe disposed in the horizontal direction may contact all of end portions of the insertion heat pipes 200 distributed in all directions, such that entire heat radiation may be obtained by a small number of thermoelectric element 600.

Figure 4:
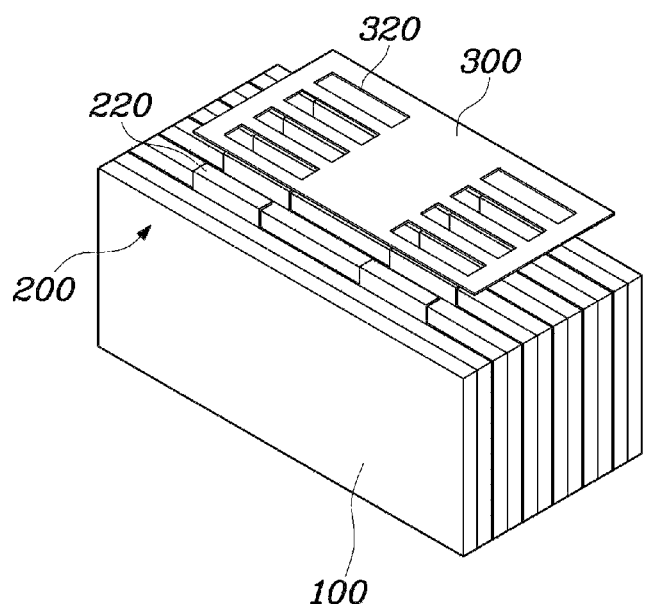
Figure 5:
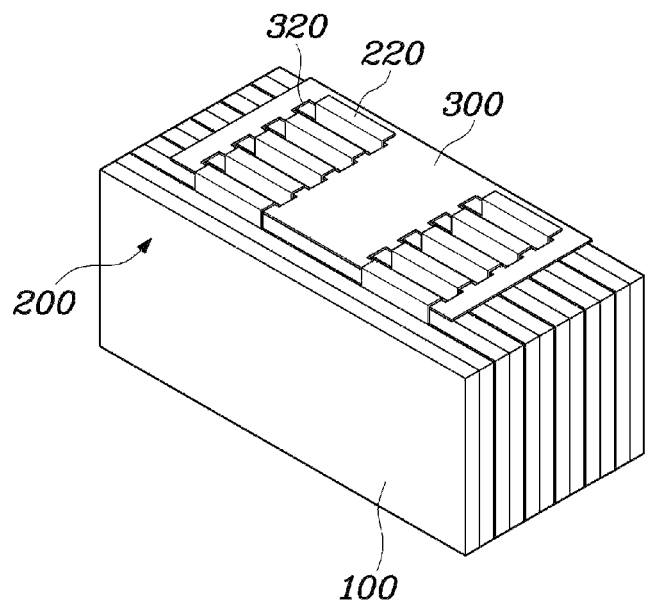

FIGS. 4 and 5 show a coupling plate. The coupling plate 300 may be disposed over the battery cells 100 such that the exposed contact parts 200 of the insertion heat pipes may penetrate through the coupling plate 300. Accordingly, the coupling plate 300 may be coupled to the conduction plate 400 so as to be closely adhered to the conduction plate 400 with the contact parts 220 interposed therebetween.

Meanwhile, penetration holes 320 having shapes corresponding to those of the upper ends of the contact parts 220 may be formed in the coupling plate 300, and the contact parts 220 may be fitted into the coupling plate 300 so as to penetrate the penetration holes 320 upwardly as shown in FIG. 4. Subsequently the coupling plate 300 may be slid laterally as shown in FIG. 5, such that the coupling plate 300 may be caught by the contact parts 220, thereby preventing the coupling plate 300 from being separated upwardly. In addition, as shown in FIG. 6, the conduction plate 400 may be seated on an upper surface of the coupling plate 300, and the thermoelectric element 600 may be installed on the conduction plate 400.

Further, the heat sink 500 may be installed on an upper surface of the thermoelectric element 600 to radiate the heat. The heat sink 500 may include a contact panel surface-contacting the heat radiating surface of the thermoelectric element 600 and a heat radiation fin 520 provided on the upper end of the contact panel, and thus, the coupling plate 300, the conduction plate 400, and the contact panel may be coupled to each other so as to be closely adhered to each other.

Figure 7:
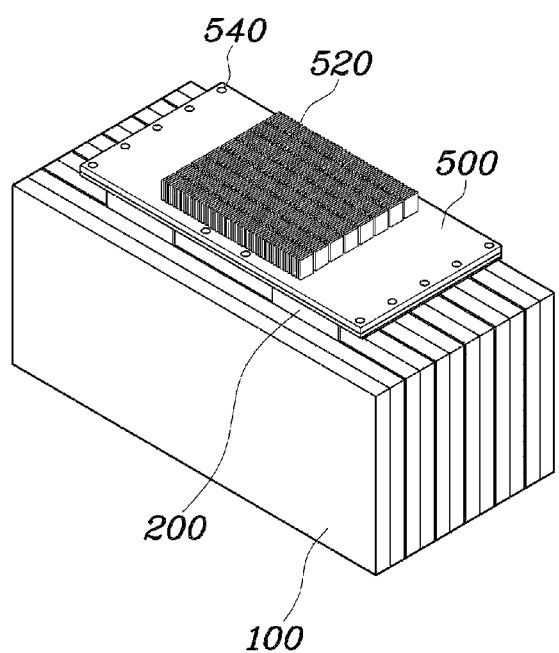

Moreover, as shown in FIGS. 1 and 7, the heat managing unit of a high-voltage battery may be assembled. In addition, as shown in FIG. 1, the battery cells 100, the conduction panels 120, the insertion heat pipes 200, the conduction plate 400, and the thermoelectric element 600 may form a heat conduction flow at an air conditioning side, the thermoelectric element 600 and the heat sink 500 may form a heat conduction flow at a heat radiating side, and the heat sink 500 may radiate the heat to the outside using convection.

Further, the coupling plate 300 may be provided and coupled to closely adhere the insertion heat pipes 200, the conduction plate 400, and the thermoelectric element 600 to each other.

The high-voltage battery in which the heat managing unit of a high-voltage battery is mounted may include: a plurality of battery cells 100 overlapped with each other such that surfaces thereof facing each other touch on each other in a state in which they vertically stand up; insertion heat pipes 200 each of which is interposed between overlapped battery cells 100 and has contact parts 220 formed by bending upper end portions in a horizontal direction in a state in which the upper end portions are exposed; a conduction plate 400 surface-contacting the contact parts 220 of the insertion heat pipes 200 to be thermally connected to the insertion heat pipes 200; a thermoelectric element 600 having an air conditioning surface and a heat radiating surface, thermally connected to the conduction plate 400 by the air conditioning surface surface-contacting the conduction plate 400 and cooling or heating the conduction plate 400 through the air conditioning surface; and a heat sink 500 surface-contacting the heat radiating surface of the thermoelectric element 600 to be thermally connected to the heat radiating surface.

According to various exemplary embodiments of the present invention, the heat managing unit of a high-voltage battery may substitute an air cooling type or a water cooling type heat management system in the related arts and manage heat of the high-voltage battery with substantially simplified configuration. The high-voltage battery including the heat managing unit may be provided.

For example, cooling and temperature raising functions may be implemented using the conventional component, such that a system configuration may remain simple. In addition, a cooling fan that has been used in a convention air cooling type system may be removed, such that noise may not occur during performing cooling.

Further, a heat pipe may be inserted instead of a battery module cooling channel of the air cooling type system, thereby reducing a volume of a battery module, and such a cooling fan, a cooling duct, and the like may be removed. Accordingly, a volume of an entire system and a size of a mechanism of a pack may decrease, thereby reducing a mold cost or the like.

In the related arts, the air cooling type system sucks indoor air to perform cooling, such that a vehicle air conditioning load may increase and indoor air cooling performance may deteriorate. However, according to the present invention, such air cooling system may not be needed, such that a driving distance of the vehicle may increase and energy efficiency may increase. In addition, when the system according to various exemplary embodiments of the present invention is applied, a closed type system may be implemented to prevent introduction of water from being introduced from a cooling air inlet/outlet or the like, which may further prevent a safety accident.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A heat managing unit of a high-voltage battery, comprising:
    insertion heat pipes interposed between overlapped battery cells and having contact parts formed by bending upper end portions in a state in which the upper end portions are exposed;
    a conduction plate surface-contacting the contact parts of the insertion heat pipes to be thermally connected to the insertion heat pipes;
    a thermoelectric element having an air conditioning surface and a heat radiating surface, thermally connected to the conduction plate by the air conditioning surface surface-contacting the conduction plate, and cooling or heating the conduction plate through the air conditioning surface; and
    a heat sink surface-contacting the heat radiating surface of the thermoelectric element to be thermally connected to the heat radiating surface.

2. The heat managing unit of a high-voltage battery of claim 1, wherein the battery cells are pouch type battery cells and are overlapped with each other so that surfaces thereof facing each other touch on each other.

3. The heat managing unit of a high-voltage battery of claim 1, wherein the insertion heat pipes are each disposed between the overlapped battery cells in a gravity direction so as to be perpendicular to a ground.

4. The heat managing unit of a high-voltage battery of claim 1, further comprising conduction panels surface-contacting entire areas of the battery cells, wherein the insertion heat pipes are interposed between the conduction panels facing each other.

5. The heat managing unit of a high-voltage battery of claim 1, wherein the insertion heat pipes are disposed in an oblique line direction inclined based on a ground between the battery cells.

6. The heat managing unit of a high-voltage battery of claim 1, wherein the conduction plate is a horizontal heat pipe disposed in the horizontal direction.

7. The heat managing unit of a high-voltage battery of claim 1, further comprising a coupling plate disposed over the battery cells and such that the exposed contact parts of the insertion heat pipes penetrate the coupling plate, wherein the coupling plate is coupled to the conduction plate so as to be closely adhered to the conduction plate with the contact parts interposed therebetween.

8. The heat managing unit of a high-voltage battery of claim 7, wherein penetration holes having shapes corresponding to those of upper ends of the contact parts are formed in the coupling plate, and the contact parts are fitted into the coupling plate so as to penetrate the penetration holes upwardly and then the coupling plate is slid laterally, such that the coupling plate is caught by the contact parts, thereby preventing the coupling plate from being separated upwardly.

9. The heat managing unit of a high-voltage battery of claim 7, wherein the heat sink includes a contact panel surface-contacting the heat radiating surface of the thermoelectric element and a heat radiation fin provided on an upper end of the contact panel, and the coupling plate, the conduction plate, and the contact panel are coupled to each other so as to be closely adhered to each other.

10. A high-voltage battery, comprising:
    a plurality of battery cells overlapped with each other such that surfaces of the plurality of the cells facing each other touch on each other;
    insertion heat pipes each of which is interposed between the overlapped battery cells and has contact parts formed by bending upper end portions in a state in which the upper end portions are exposed;
    a conduction plate surface-contacting the contact parts of the insertion heat pipes to be thermally connected to the insertion heat pipes;
    a thermoelectric element having an air conditioning surface and a heat radiating surface, thermally connected to the conduction plate by the air conditioning surface surface-contacting the conduction plate, and cooling or heating the conduction plate through the air conditioning surface; and
    a heat sink surface-contacting the heat radiating surface of the thermoelectric element to be thermally connected to the heat radiating surface.

* * * * *